UNITED STATES PATENT OFFICE.

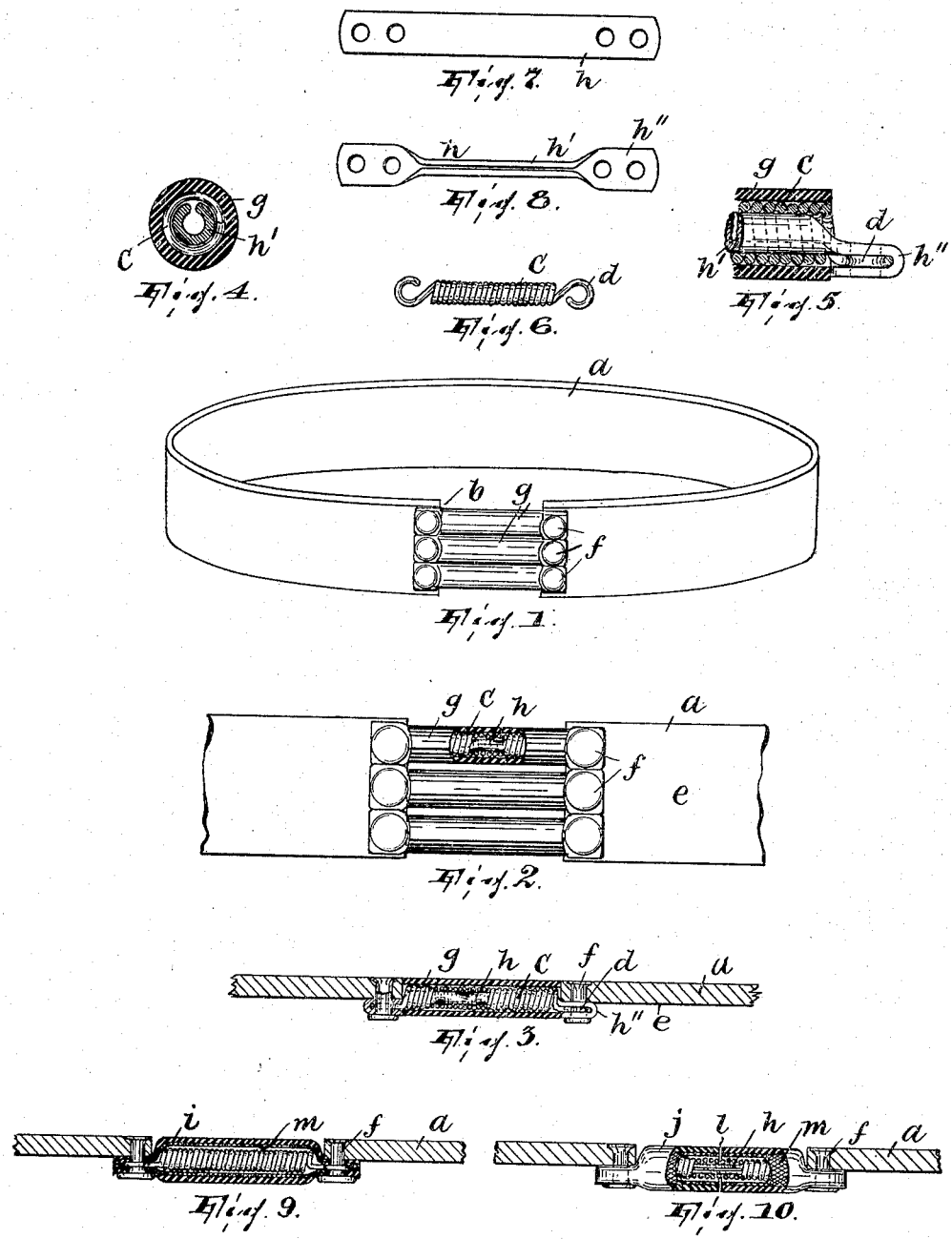

AQUILA H. GRIFFIN AND GEORGE GRIFFIN, OF PATERSON, NEW JERSEY, ASSIGNORS OF ONE-TENTH TO JOHN W. STEWARD, OF PATERSON, NEW JERSEY.

DRIVING-BELT.

1,228,429.  Specification of Letters Patent.  Patented June 5, 1917.

Application filed September 25, 1916. Serial No. 121,928.

*To all whom it may concern:*

Be it known that we, AQUILA H. GRIFFIN and GEORGE GRIFFIN, subjects of the King of England, residing at Paterson, in the county of Passaic and State of New Jersey, have invented certain new and useful Improvements in Driving-Belts, of which the following is a specification.

Our invention consists in certain improvements in driving belts whereby a substantial and durable and relatively inexpensive belt is produced that is self-acting to take up any slack due to stretching thereof, thereby to preserve the driving efficiency of the belt. Characterizing features of our improved belt are novel means to restrict the distention of the belt and to sheathe the elastic portion or portions at the inner side of the belt from wearing influences, as of the pulleys.

In the accompanying drawing,

Figure 1 is a perspective view of the belt;

Fig. 2 a fragmentary plan, parts appearing broken away;

Fig. 3 is a longitudinal sectional view;

Fig. 4 a transverse and Fig. 5 a fragmentary longitudinal sectional view on a larger scale;

Fig. 6 shows one of the springs;

Figs. 7 and 8 are elevations of one of the thongs in the shapes, respectively, before and after assembling with the spring; and, Figs. 9 and 10 are sectional views illustrating modifications.

The belt includes a section $a$ of relatively non-elastic strip material, such as leather, fabric or the like, capable of assuming good tractive contact with the pulleys. In the belt there is shown a gap $b$, but it is not indispensable that there be only one gap. Connecting the ends of the material at the gap is elastic means, preferably taking the form, as herein shown, of a helical spring $c$, having its ends $d$ formed as loops or eyes lying in a common plane laterally offset with respect to the axis of the spring. The spring is preferably arranged with its body portion mainly in the gap, i. e., between the ends of the material $a$, and its loops or eyes $d$ are at the outer face $e$ (Fig. 3) of the belt. The ends of the spring are secured to the ends of the material at the gap by the rivets $f$; they are preferably clenched immovably with respect to the material $a$ so as to prevent the wear that would be incident to articulation at these points.

To protect the spring from wear incident to its possible contact with the pulleys it has attached thereto a sheath $g$ which in the present instance is tubular in form and houses the spring, which is threaded through it before the ends of the spring are attached to the ends of the material $a$. The tube $g$ may be composed of rubber and may be reinforced with duck or other fabric (as hereinafter explained in connection with Figs. 9 and 10 or otherwise), so as to be flexible but durable.

For preventing overdistention of the spring there is provided, in the adaptation shown, a flexible thong $h$, as of raw hide. In the present instance this thong is shown threaded through the spring, its intermediate portion $h'$, i. e., where it is embraced by the spring, being rolled or folded (Figs. 4, 5 and 8) lengthwise and its ends $h''$ being left flat. In the preferred form, each end $h''$ is folded back upon itself and embraces the corresponding loop or eye $d$ of the spring, said folded end as well as the loop or eye being penetrated by the rivet $f$. The object of this latter construction is to save possibly injuring the spring on upsetting the rivet when assembling the parts. The thong, when the belt is contracted, is somewhat longer than the spring, so that it then assumes a flexed or sinuous form (Fig. 3). On distending the belt the thong affords a positive limit to the distention, thus preventing straining the spring.

In Figs. 9 and 10 the ends of the tube $i$, of approximately the same length as the spring, are shown clenched by the rivets $f$. In the former of these figures this arrangement makes it possible to utilize the tube as the means to restrict the distention of the spring; in the latter figure the thong $h$ is utilized to restrict the distention, the tubular sheath being in this case divided into two portions, as at $l$, so that the tube remains simply a sheath.

Figs. 9 and 10 further show at $m$ fabric reinforcing for the tube.

It is preferred that there be in the gap $b$ a plurality of the elastic means, sheathing means and means to restrict the distention of the elastic means, as shown in Figs. 1 and 2. It is also preferred that the spring or springs be elevated somewhat (Figs. 3, 9 and 10) with reference to the inner face of the belt, so that even if the sheath $g$, $i$ or $j$ were omitted such spring or springs would not contact with the pulleys.

Having thus fully described our invention, what we claim as new and desire to secure by Letters Patent is:—

1. A driving belt formed for the major portion of its circumference of relatively inelastic material having a gap therein and including elastic means in the gap connecting the adjoining ends of said material and also including means, carried by and arranged at the relatively inner side of the elastic means, to sheathe the latter.

2. A driving belt formed for the major portion of its circumference of relatively inelastic material having a gap therein and including elastic means in the gap connecting the adjoining ends of said material and also including tubular means, having the elastic means threaded therethrough, to sheathe the latter.

3. A driving belt formed for the major portion of its circumference of relatively inelastic material having a gap therein and including elastic means in the gap connecting the adjoining ends of said material and also including a flexible tube, having the elastic means threaded therethrough, to sheathe the latter.

4. A driving belt formed for the major portion of its circumference of relatively inelastic material having a gap therein and including elastic means in the gap connecting the adjoining ends of said material and also including means to positively limit the extension of the elastic means.

5. A driving belt formed for the major portion of its circumference of relatively inelastic material having a gap therein and including elastic means in the gap to connect the adjoining ends of the material, means, to connect said ends, for resisting the extension of the elastic means, and common means to secure both of the other means at their ends to said ends of the material.

6. A driving belt formed for the major portion of its circumference of relatively inelastic material having a gap therein and including an extensible spring in the gap to connect said ends, a flexible member, to connect said ends, for resisting the extension of said spring and having its end portions folded around the ends of the spring, and clenching devices penetrating said material and the spring ends and the folded end portions of said member.

7. A driving belt formed for the major portion of its circumference of relatively inelastic material having a gap therein and including a helical spring in the gap connecting the adjoining ends of the material, and means, threaded through the spring, to resist the extension of the spring.

8. A driving belt including an extensible elastic member and a sheath member attached thereto and covering the relatively inner side of said member.

9. A driving belt including an extensible elastic member and a sheath member housing said elastic member.

10. A driving belt including a helical spring and a tubular covering member housing the spring.

11. A driving belt formed for the major portion of its circumference of relatively inelastic material having a gap therein and including elastic means in the gap connecting the adjoining ends of said material and also including a flexible sheath arranged at the relatively inner side of the elastic means.

12. A driving belt formed for the major portion of its circumference of relatively inelastic material having a gap therein and including elastic means in the gap connecting the adjoining ends of said material and also including means, joining the said ends, to resist separating movement thereof and consequent over-distention of the elastic means.

In testimony whereof we affix our signatures.

AQUILA H. GRIFFIN.
GEORGE GRIFFIN.

Copies of this patent may be obtained for five cents each, by addressing the "Commissioner of Patents, Washington, D. C."